United States Patent [19]

Anderson

[11] Patent Number: 5,479,850
[45] Date of Patent: Jan. 2, 1996

[54] APPARATUS AND METHOD FOR A BREADMAKING MACHINE

[75] Inventor: Richard M. Anderson, Waterville, Ohio

[73] Assignee: The Andersons, Maumee, Ohio

[21] Appl. No.: 140,323

[22] Filed: Oct. 22, 1993

[51] Int. Cl.$^6$ ............................................ A47J 27/14
[52] U.S. Cl. ............................ 99/357; 99/334; 99/470; 99/477
[58] Field of Search ....................... 99/326, 353, 348, 99/339, 357, 334, 441, 448, 470, 477, 494

[56] References Cited

U.S. PATENT DOCUMENTS

| | | | |
|---|---|---|---|
| 1,634,259 | 7/1927 | Hutchinson | 99/494 |
| 2,970,532 | 2/1961 | Skelton | 99/494 |
| 3,822,056 | 7/1974 | Hawes, Jr. et al. | 99/494 |
| 4,250,802 | 2/1981 | Rubio | 99/348 |
| 4,366,178 | 12/1982 | Reynolds et al. | 99/470 |
| 4,649,810 | 3/1987 | Wong | 99/326 |
| 4,691,625 | 9/1987 | Blain et al. | 99/348 |
| 4,711,166 | 12/1987 | Chen | 99/353 |
| 4,762,057 | 8/1988 | Hirota et al. | 99/348 |
| 4,805,524 | 2/1989 | Deneuville et al. | 99/339 |
| 4,938,125 | 7/1990 | Wong | 99/326 |
| 4,938,127 | 7/1990 | van Lengerich | 99/353 |
| 4,944,218 | 7/1990 | Cresson | 99/357 |
| 4,957,041 | 9/1990 | van Lengerich | 99/348 |
| 4,979,435 | 12/1990 | Hayashi et al. | 99/334 |
| 4,984,514 | 1/1991 | van Lengerich | 99/348 |
| 5,016,528 | 5/1991 | Chen | 99/353 |
| 5,033,367 | 7/1991 | Florindez | 99/353 |
| 5,109,758 | 5/1992 | Voegtlin | 99/443 C |

*Primary Examiner*—David Scherbel
*Assistant Examiner*—James F. Hook
*Attorney, Agent, or Firm*—Gifford, Krass, Groh, Sprinkle, Patmore, Anderson & Citkowski

[57] ABSTRACT

An apparatus and method for making bread according to a predetermined ingredient recipe having a grain supply bin, a grinder for the grain, a dry ingredient supply, and a liquid ingredient supply. A processing unit selectively introduces predetermined amounts of the grain and the liquid/dry ingredients into a mixing chamber. The dough mixture produced is conveyed through proofing and baking steps.

9 Claims, 2 Drawing Sheets

APPARATUS AND METHOD FOR A BREADMAKING MACHINE

BACKGROUND OF THE INVENTION

1. Field of the Invention

The present invention relates to breadmaking machines and, more particularly, to a breadmaking machine for making a variety of breads using a multi-station assembly.

2. Description of the Prior Art

Various apparatus for making bread and related goods are known in the art. Specifically, such apparatus usually include a means for mixing a dough and then for baking the mixture to produce a desired end product.

U.S. Pat. No. 4,938,127, issued to van Lengerich, discloses a device for automatically making a cookie type product. Two extrusion machines are used in series to blend, mix and deliver a partially formed product to the second extrusion device where further ingredients are added. The product is then mixed and delivered to conveyors for transport through a dielectric heating oven.

U.S. Pat. No. 5,016,528, issued to Chen, discloses baking equipment for producing buns, cakes, and the like. The product is produced in individual pan and cover containers in which dough is delivered to the pans and subsequently shaped and treated in successive steps before delivery to an oven for baking.

The shortcomings of the above-described patents include the lack of selection of ingredients which can be provided during the mixing stage in order to formulate different end products. Another drawback is the failure to provide a grinder for grinding whole grain supplied from a supply bin in combination with wet or liquid ingredients and dry ingredients in order to produce a wide variety of baked goods.

SUMMARY OF THE PRESENT INVENTION

The present invention is an apparatus and method for a breadmaking machine which is capable of producing a variety of breads from a wide selection of both liquid and dry ingredients. The breadmaking machine has a whole grain storage bin connected to a mixer. A grinder grinds the grain supplied from the storage bin and introduces it into the mixer concurrently with both liquid and dry ingredients which are separately inputted into the mixer. A processor control unit is connected to the grain supply and both the liquid and dry ingredients and controls the type and amount of ingredients and the amount of grain which is supplied to the mixer. In a preferred embodiment of the invention, the mixer is positioned on top of a scale. The scale determines the quantity of each ingredient which is fed into the mixer by sensing the weight of the applied ingredient. The scale is connected to the ingredient supplies through a processing unit so as to selectively activate and de-activate the ingredient supplies.

In one embodiment an extruder forms the dough into loaves and conveys the dough on a conveyor to a proofing unit which causes the dough to rise. The dough is then transferred to a baking oven and then to cooling racks once the baking step is completed.

In another embodiment of the apparatus of the invention, a plurality of mixers are employed for mixing a number of batches of dough. Each mixer can be supplied with a different set of ingredients so as to customize the type of bread to be produced.

A method for making bread is also provided which utilizes the steps as substantially described in the above summary of the apparatus of the invention.

BRIEF DESCRIPTION OF THE DRAWING

Reference is made to the attached drawing of the present invention wherein reference to the numerals in the description refer to like parts throughout the several views and in which.

DESCRIPTION OF THE PREFERRED EMBODIMENT

Figure 1:
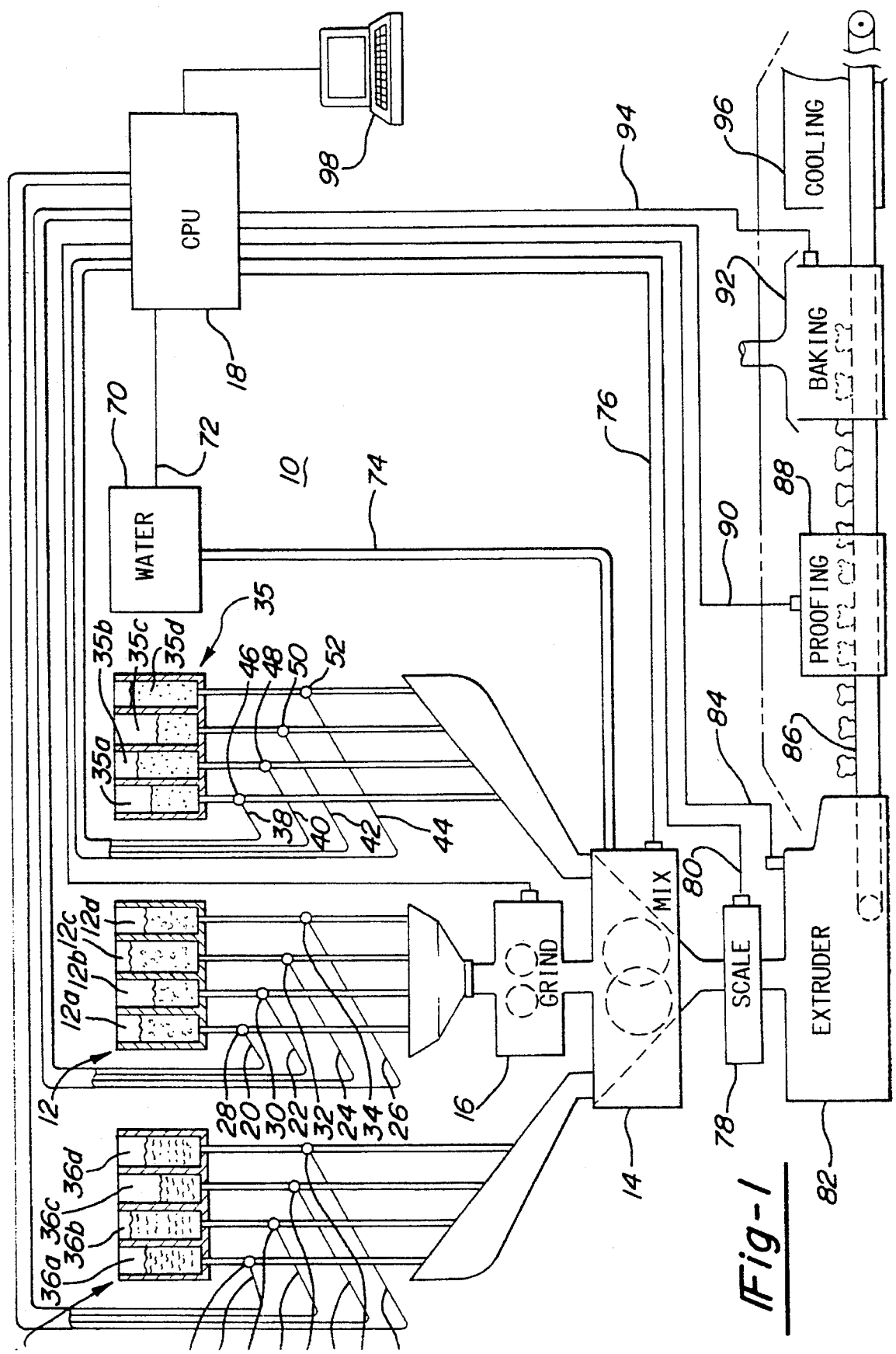
FIG. 1 is a diagrammatical view of a first preferred embodiment of the breadmaking machine of the present invention.

Referring to FIG. 1, a first preferred embodiment of the breadmaking machine of the present invention is shown at 10. A whole grain storage bin 12 is connected to a mixing chamber 14. A grinder 16 lies intermediate the storage bin 12 and the mixing chamber 14 and grinds to a fine powder the desired quantity of grain supplied from the storage bin 12. The storage bin 12 can be divided into a number storage bins 12a, 12b, 12c and 12d, each containing a different grain, and one or more of these grains can be selectively introduced into the mixing chamber 14.

A central processing unit 18 is operatively connected to the grain bins 12a–12d by lines 20, 22, 24, and 26, respectively. A series of dispensing valves 28, 30, 32 and 34 determine the amount of grain to be dispensed from each bin 12a–12d according to preprogrammed recipe.

The processing unit 18 is also operatively connected to supplies of both dry ingredients 35 and liquid ingredients 36. The dry and liquid ingredient supplies 35 and 36 can also be divided into a number of different dry ingredient supplies bins 35a, 35b, 35c and 35d and liquid ingredient containers 36a, 36b, 36c and 36d and can be selectively inputted into the mixing chamber concurrently with and in the same fashion as the grain from the grain storage bin 12. For example, the dry ingredient storage bins can include ingredients such as salt, flour, sugar, yeast, fruit, poppyseeds, etc. The liquid ingredients may include vanilla extract, water, etc.

The processing unit is connected to the dry ingredient bins 35a–35d by lines 38, 40, 42 and 44. Dispensing valves 46, 48, 50 and 52 are connected to the lines 38, 40, 42 and 44, respectively, and determine the amount of each ingredient which is sent to the mixing chamber. In the same fashion, the processing unit 18 is connected to the liquid ingredient containers 36a–36d by lines 54, 56, 58 and 60 which engage dispensing valves 62, 64, 66 and 68.

A separate water supply 70 is connected to the processing unit 18 by line 72 and may be inputted to the mixing chamber 14 through line 74 in the place of or in combination with the liquid ingredients from containers 36a–36d as may be desired.

The mixing chamber 14 is supported on a scale 78. The scale determines the amount of each ingredient fed into the mixing chamber by sensing the weight of the ingredients. Line 80 connects the scale 78 to the processor 18.

The dough is then thoroughly mixed in the mixing chamber. The processor 18 is connected to the mixer 14 by line 76 and determines the extend to which mixing occurs. The scale 78 transfers the dough to an extruder 82, and the extruder is connected by line 84 to the processor 18. The extruder 82 sections the dough into loaves.

The extruder 82 is positioned relative to a conveyor 86 which transports the sectioned loaves of dough into a proofing unit 88. The proofing unit 88 is connected to the processing unit 18 by line 90 for temperature control in raising the bread. The loaves of bread are then transported from the proofing unit 88 along the conveyor 86 into a baking oven 92. The oven 92 is connected to the processor 18 by line 94 for temperature control and bakes the bread loaves according to the recipe stored in the processor 18. Once the baking stage is completed, the bread is transported to a cooling unit 96 and is loaded, as is conventionally known in the art, onto storage racks or the like.

According to the first preferred embodiment, a single large batch of bread loaves can be generated by the bread making machine of the present invention using the processing unit 18 and selecting from a wide variety of whole grains and liquid/dry ingredients. A keyboard control 98 can be inputted to the processor 18 to facilitate the entry of a desired recipe program for generating a batch of loaves.

Figure 2:
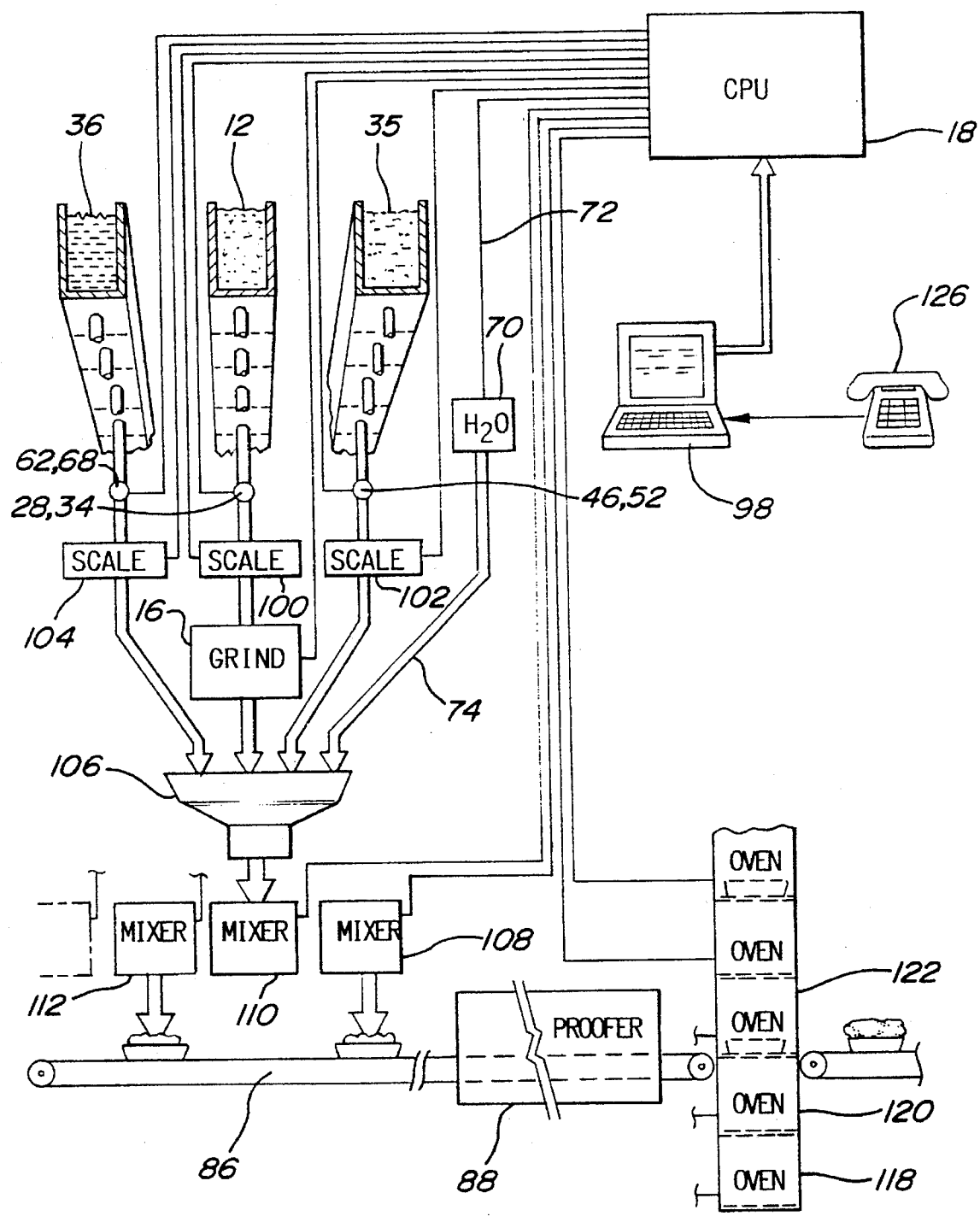
FIG. 2 is a diagrammatical view of a second preferred embodiment of the breadmaking machine of the present invention.

Referring to FIG. 2, there is shown a second preferred embodiment of the present invention. A number of the elements shown in FIG. 2 are common to the disclosure of FIG. 1 and are identified by the same numbers. In the place of the scale 78 of FIG. 1 there are provided separate scales 100, 102 and 104 located beneath the grain storage bin 12 and the dry ingredient and liquid ingredient storage bins 35 and 36, respectively.

The ingredients 12, 35, 36 and the water input 70 are all fed for the dough mixture into a common hopper 106. The common hopper 106 transfers the dough mixture into a sequence of separate mixing chambers such as chambers 108, 110, 112. The provision of a number of separate mixing chambers enables a number of different bread recipes using different combinations of ingredients to be sequentially produced. Each mixing chamber therefore is capable of the production of a loaf of bread having characteristics different from any other mixing chamber.

The loaves of bread are individually mixed and are then deposited onto the conveyor 86. The loaves of bread are then conveyed into the proofing unit 88 as previously described where the bread is raised. A series of individual baking ovens such as ovens 118, 120, 122 are provided for receiving, respectively, each loaf of bread. The ovens then bake the bread as conventionally taught and deposit the loaves onto a conveyor or cooling racks.

The second embodiment of the invention accordingly enables the breadmaking machine to produce a different kind of loaf using different combinations of ingredients, as desired, for each subsequent loaf of bread produced. This is in contrast to the first embodiment which produces a larger single batch of bread loaves using a single recipe of ingredients.

The breadmaking machine of the present invention may be conveniently located in a retail outlet store, such as a supermarket. Customers can come into the store and custom order a specific loaf of bread to their own recipe criteria. As a further convenience, telephone service such as that indicated by telephone 126 could be hooked into the processor 18 and keyboard 98 such that the customer can order the loaf of bread from his or her home and automatic billing can be incorporated into the control unit 18 for this mode.

The elements of the mixer chamber, extruder, proofing unit, and ovens can also be integrated into one convenient machine which is fed by the various ingredient inputs.

A process for producing bread using the breadmaking machine of the present invention is also disclosed. The process includes means for feeding a selective amount of at least one whole grain, at least one dry ingredient, and at least one liquid ingredient simultaneously into a common mixing chamber. Further steps include mixing the dough, portioning the dough into sections, and proofing the sections of dough until the dough rises. The dough is subsequently baked and cooled. The means for selectively feeding the various ingredients, as well as the operating of the mixing, portioning, extruding, proofing and baking processes are all controlled by the processing unit.

Accordingly, a single large batch or a number of different individual loaves of bread may be produced using the process of the present invention.

Having described my invention, many different embodiments will become apparent to one skilled in the art to which the invention pertains without deviating from the scope of the disclosure as set forth in the appended claims.

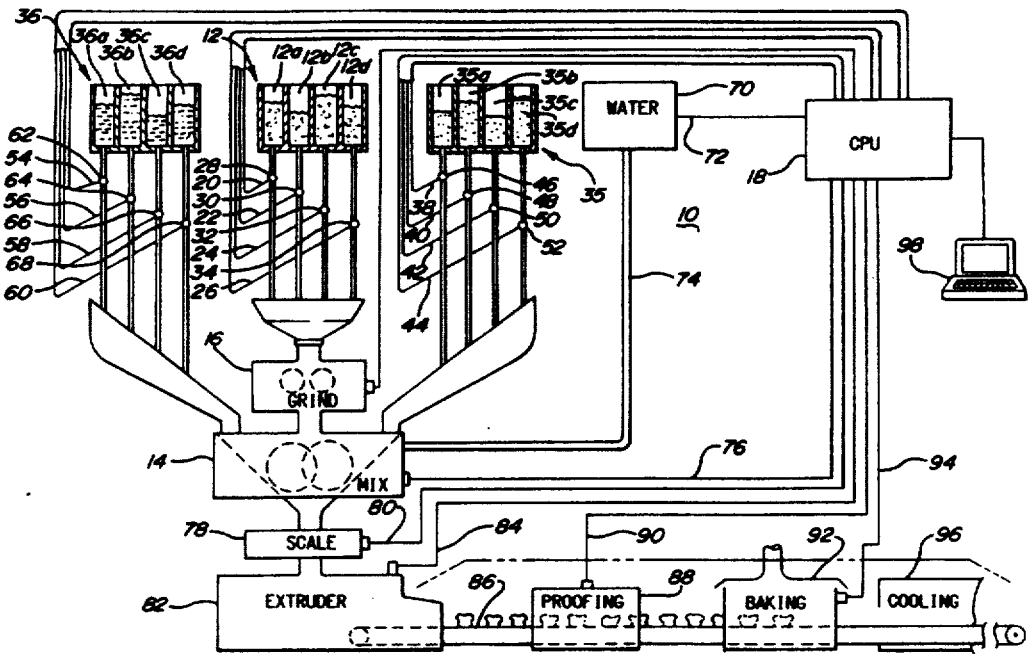

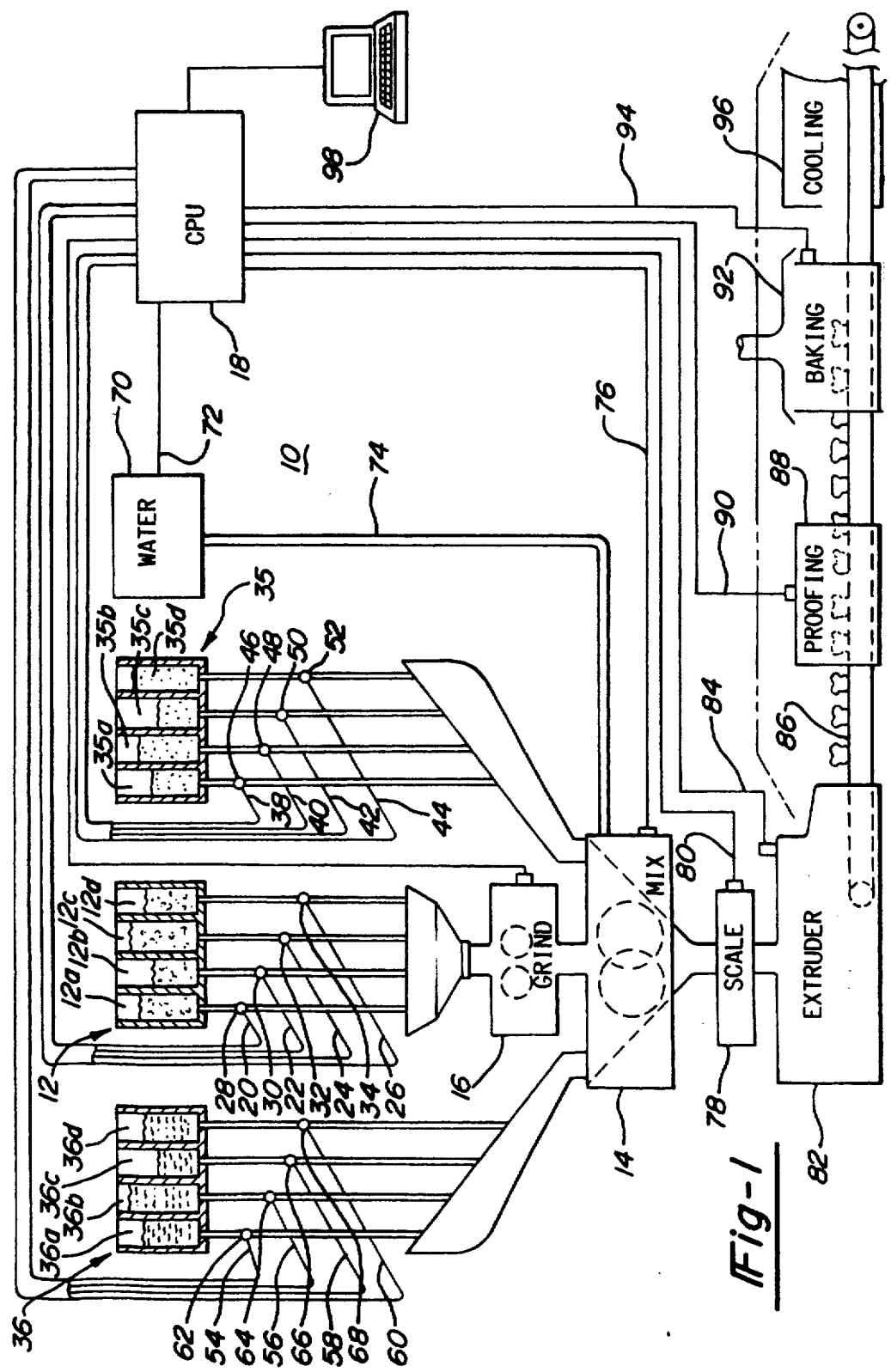

I claim:

1. A machine for producing a wide range of mixtures of dough for the making of a variety of breads, comprising in combination:

a process control unit;

means for inputting a plurality of bread recipes to said process control unit;

means for selecting one of said plurality of recipes:

a plurality of whole grain storage bins;

a grinder;

means for feeding one or more grains from said plurality of grain storage bins to said grinder according to said selected recipe as determined by said process control unit;

mixing means for forming a dough;

means for delivering ground grain from said grinder to said mixing means;

a plurality of dry ingredient storage bins;

means for delivering a dry ingredient from at least one of said plurality of dry ingredient storage bins to said mixing means as determined by said process control unit according to said selected recipe;

liquid delivering means for delivering a liquid ingredient as determined by said process control unit according to said selected recipe to said mixing means; and means for delivering bread loaf portions of dough from said mixing means.

2. The breadmaking machine according to claim 1, further comprising a proofer for receiving said bread loaf portions from said mixing means.

3. The breadmaking machine according to claim 2, further comprising an oven means for receiving said bread load portions from said proofer.

4. The breadmaking machine according to claim 3, further comprising means for delivering said bread load portions from said oven means to a cooling rack.

5. The bread making machine according to claim 1 wherein liquid delivery means includes means for delivering water to said mixing means.

6. The bread making machine according to claim 5 wherein said liquid delivery means includes a plurality of liquid storage containers and means for delivering a liquid ingredient from at least one of said plurality of liquid storage containers as determined by said process control unit according to said selected recipe.

7. The bread making machine according to claim 1 wherein said means for delivering bread loaf portions from said mixing means includes an extruder.

8. The bread making machine according to claim 1 wherein said mixing means includes a plurality of mixers.

9. The bread making machine according to claim 3 wherein said oven means includes a plurality of ovens.

* * * * *

UNITED STATES PATENT AND TRADEMARK OFFICE
CERTIFICATE OF CORRECTION

PATENT NO.    : 5,479,850
DATED         : January 2, 1996
INVENTOR(S)   : Richard M. Anderson It is certified that error appears in the above-identified patent and that said Letters Patent is hereby corrected as shown below:

The title page, showing an illustrative figure, should be deleted and substitute therefor the attached title page.

Delete Drawing Sheet 1 and substitute therefor the Drawing Sheet consisting of FIG. 1, as shown on the attached page.

Signed and Sealed this

Ninth Day of December, 1997

*Attest:*

BRUCE LEHMAN

*Attesting Officer*   Commissioner of Patents and Trademarks

United States Patent [19]

Anderson

[11] Patent Number: 5,479,850
[45] Date of Patent: Jan. 2, 1996

[54] APPARATUS AND METHOD FOR A BREADMAKING MACHINE

[75] Inventor: Richard M. Anderson, Waterville, Ohio

[73] Assignee: The Andersons, Maumee, Ohio

[21] Appl. No.: 140,323

[22] Filed: Oct. 22, 1993

[51] Int. Cl.⁶ .................................................. A47J 27/14
[52] U.S. Cl. ......................... 99/357; 99/334; 99/470; 99/477
[58] Field of Search ........................ 99/326, 353, 348, 99/339, 357, 334, 441, 448, 470, 477, 494

[56] References Cited

U.S. PATENT DOCUMENTS

| | | | |
|---|---|---|---|
| 1,634,259 | 7/1927 | Hutchinson | 99/494 |
| 2,970,532 | 2/1961 | Skelton | 99/494 |
| 3,822,056 | 7/1974 | Hawes, Jr. et al. | 99/494 |
| 4,250,802 | 2/1981 | Rubio | 99/348 |
| 4,366,178 | 12/1982 | Reynolds et al. | 99/470 |
| 4,649,810 | 3/1987 | Wong | 99/326 |
| 4,691,625 | 9/1987 | Blain et al. | 99/348 |
| 4,711,166 | 12/1987 | Chen | 99/353 |
| 4,762,057 | 8/1988 | Hirota et al. | 99/348 |
| 4,805,524 | 2/1989 | Deneuville et al. | 99/339 |
| 4,938,125 | 7/1990 | Wong | 99/326 |
| 4,938,127 | 7/1990 | van Lengerich | 99/353 |
| 4,944,218 | 7/1990 | Cresson | 99/357 |
| 4,957,041 | 9/1990 | van Lengerich | 99/348 |
| 4,979,435 | 12/1990 | Hayashi et al. | 99/334 |
| 4,984,514 | 1/1991 | van Lengerich | 99/348 |
| 5,016,528 | 5/1991 | Chen | 99/353 |
| 5,033,367 | 7/1991 | Florindez | 99/353 |
| 5,109,758 | 5/1992 | Voegtlin | 99/443 C |

Primary Examiner—David Scherbel
Assistant Examiner—James F. Hook
Attorney, Agent, or Firm—Gifford, Krass, Groh, Sprinkle, Patmore, Anderson & Citkowski

[57] ABSTRACT

An apparatus and method for making bread according to a predetermined ingredient recipe having a grain supply bin, a grinder for the grain, a dry ingredient supply, and a liquid ingredient supply. A processing unit selectively introduces predetermined amounts of the grain and the liquid/dry ingredients into a mixing chamber. The dough mixture produced is conveyed through proofing and baking steps.

9 Claims, 2 Drawing Sheets